United States Patent
Avey et al.

(10) Patent No.: US 12,247,561 B2
(45) Date of Patent: Mar. 11, 2025

(54) SEALING ASSEMBLY WITH REPOSITIONABLE SEAL

(71) Applicant: GD Energy Products, LLC, Tulsa, OK (US)

(72) Inventors: Adam Bradley Avey, Tulsa, OK (US); Konner Casey Kay, Broken Arrow, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 289 days.

(21) Appl. No.: 17/549,997

(22) Filed: Dec. 14, 2021

(65) Prior Publication Data
US 2023/0184241 A1    Jun. 15, 2023

(51) Int. Cl.
| | | |
|---|---|---|
| *F04B 39/12* | (2006.01) | |
| *F04B 53/00* | (2006.01) | |
| *F16J 15/3268* | (2016.01) | |

(52) U.S. Cl.
CPC ............ *F04B 53/00* (2013.01); *F04B 39/121* (2013.01); *F04B 39/123* (2013.01); *F16J 15/3268* (2013.01)

(58) Field of Classification Search
CPC .......................... F04B 39/123; F16J 15/3268
USPC ........ 277/630, 619, 620, 622, 641–643, 648
See application file for complete search history.

(56) References Cited

U.S. PATENT DOCUMENTS

| | | | |
|---|---|---|---|
| 2,756,960 A | 7/1956 | Church | |
| 2,856,857 A | 10/1958 | Saalfrank | |
| 3,700,003 A | 10/1972 | Smith | |
| 3,792,939 A | 2/1974 | Zalis | |
| 3,866,813 A * | 2/1975 | Arnold | F16J 15/3268 277/551 |
| 5,208,043 A * | 5/1993 | Gatarz | B29C 33/0044 425/117 |
| 5,209,495 A | 5/1993 | Palmour | |
| 5,234,194 A | 8/1993 | Smith | |
| 5,362,215 A | 11/1994 | King | |
| 5,540,570 A | 7/1996 | Schuller | |
| 6,623,259 B1 | 9/2003 | Blume | |
| 6,910,871 B1 | 6/2005 | Blume | |
| 7,074,020 B2 | 7/2006 | Navarro | |
| 7,168,440 B1 | 1/2007 | Blume | |

(Continued)

FOREIGN PATENT DOCUMENTS

JP    2011256828 A    12/2011

OTHER PUBLICATIONS

Gardner Denver, Inc., "Single Acting Triplex Pump", Design Version: 6, Nov. 2020, 54 pages.

*Primary Examiner* — Christopher S Bobish
(74) *Attorney, Agent, or Firm* — Edell, Shapiro & Finnan, LLC

(57) ABSTRACT

A sealing assembly for a fluid end of a reciprocating pump is installable within a segment of a casing of the fluid end and is arranged to form a seal with the segment. The sealing assembly includes a closure element and a seal element. The closure element has a sealing portion with a lateral surface that faces an interior wall of the segment of the fluid end and that includes a single groove. The seal element is sized to be installed in the single groove and includes a repositionable seal. The repositionable seal is movable axially within the single groove so that the repositionable seal can be positioned in multiple sealing positions.

18 Claims, 10 Drawing Sheets

(56) References Cited

U.S. PATENT DOCUMENTS

| | | | |
|---|---|---|---|
| 7,186,097 B1 | 3/2007 | Blume | |
| 7,506,574 B2* | 3/2009 | Jensen | F04B 53/007 417/454 |
| 7,717,433 B2* | 5/2010 | Taylor | F16J 15/26 277/416 |
| 9,010,761 B2* | 4/2015 | Deutsch | F16J 15/008 277/300 |
| 9,494,197 B2* | 11/2016 | Capoldi | F16C 33/7886 |
| 9,739,130 B2 | 8/2017 | Young | |
| 10,240,678 B2* | 3/2019 | Toth | F16J 15/3284 |
| 10,288,178 B2 | 5/2019 | Nowell et al. | |
| 10,519,950 B2* | 12/2019 | Foster | F16K 5/0471 |
| 10,591,070 B2 | 3/2020 | Nowell et al. | |
| 10,895,325 B2 | 1/2021 | Nowell et al. | |
| 10,907,738 B2 | 2/2021 | Nowell et al. | |
| 10,962,001 B2 | 3/2021 | Nowell | |
| 11,143,315 B2 | 10/2021 | Nowell et al. | |
| 11,225,861 B1 | 1/2022 | Dille | |
| 11,408,419 B2 | 8/2022 | Foster | |
| 11,421,679 B1* | 8/2022 | Mullins | F04B 53/164 |
| 11,421,680 B1 | 8/2022 | Smith | |
| 11,434,901 B2* | 9/2022 | Nowell | F04B 37/12 |
| 11,441,424 B2* | 9/2022 | Foster | F16K 5/0492 |
| 11,454,321 B2 | 9/2022 | Mullins | |
| 11,692,543 B2* | 7/2023 | Chase | F16J 9/20 92/87 |
| 11,698,063 B2* | 7/2023 | Jian | F16K 5/0478 417/437 |
| 2003/0184018 A1 | 10/2003 | Upton | |
| 2004/0234404 A1 | 11/2004 | Vicars | |
| 2006/0045782 A1 | 3/2006 | Kretzinger | |
| 2009/0097992 A1 | 4/2009 | Fischer | |
| 2011/0189040 A1 | 8/2011 | Vicars | |
| 2012/0141308 A1 | 6/2012 | Saini | |
| 2018/0275012 A1 | 9/2018 | Hunt | |
| 2019/0010941 A1 | 1/2019 | Li | |
| 2019/0032781 A1 | 1/2019 | Christopher | |
| 2019/0226589 A1 | 7/2019 | Nowell et al. | |
| 2020/0355270 A1 | 11/2020 | Li | |
| 2020/0386218 A1 | 12/2020 | Feistel | |
| 2020/0400130 A1 | 12/2020 | Poehls et al. | |
| 2021/0190067 A1* | 6/2021 | Nowell | F04B 1/0538 |
| 2023/0220840 A1 | 7/2023 | Avey et al. | |

* cited by examiner

SEALING ASSEMBLY WITH REPOSITIONABLE SEAL

FIELD OF INVENTION

The present invention relates to the field of high pressure reciprocating pumps and, in particular, to a sealing arrangement for fluid ends of high pressure reciprocating pumps.

BACKGROUND

High pressure reciprocating pumps are often used to deliver high pressure fluids during earth drilling operations. One or more sealing arrangements are typically provided in the fluid end to seal conduits formed in the fluid end and prevent, or at least discourage, leakage. More specifically, the fluid end may define an internal chamber and one or more conduits may define pathways between the internal chamber and one or more external surfaces of the fluid end. At least some segments of these conduits may be sealed with a sealing assembly (i.e., a cover, plug, and/or sleeve) that includes or defines one or more seals. These seals may prevent, or at least discourage, leakage through the conduits.

SUMMARY

The present application relates to techniques for sealing a segment of a fluid end of a high pressure reciprocating pump. The techniques may be embodied as a sealing assembly that may be provided independent of any other elements incorporated in a fluid end, as part of a kit, as part of a fluid end, and/or as part of a reciprocating pump. Additionally, the techniques may be embodied as a method for sealing a segment of a fluid end of a high pressure reciprocating pump.

More specifically, in accordance with at least one embodiment, the present application is directed to a sealing assembly for a fluid end of a reciprocating pump. The sealing assembly is installable within a segment of a casing of the fluid end and is arranged to form a seal with the segment. The sealing assembly includes a closure element and a seal element. The closure element has a sealing portion with a lateral surface that faces an interior wall of the segment of the fluid end. The closure element also includes a single groove. The seal element is sized to be installed in the single groove and includes a repositionable seal. The repositionable seal is movable axially within the single groove so that the repositionable seal can be positioned in multiple sealing positions.

Among other advantages, the single groove allows for more seal placements over a fixed axial length, at least as compared to closure elements with multiple grooves. The single groove may be less expensive to manufacture than multiple groove arrangements. Still further, since the single groove allows multiple seal placements, the seal assembly may reduce costs and alleviate inventory tracking/maintenance issues for end users that typically use multiple plugs/covers/sleeves to achieve multiple seal positions.

In at least some embodiments, the seal element includes one or more seal carriers configured to position the repositionable seal within the single groove. For example, the one or more seal carriers may form a pocket for the repositionable seal and the pocket may be axially repositionable, e.g., to reposition the repositionable seal along the downstream direction. In some of these instances, an internal surface of the repositionable seal abuts the pocket and any internal surfaces of any seal carriers defining the pocket abut an axially extending surface of the single groove. Additionally or alternatively, the pocket may be repositionable by replacing the one or more seal carriers with one or more new seal carriers that form a new pocket in a new axial position (e.g., a downstream axial position). Among other advantages, the pocketed seal carriers may protect an internal surface of the repositionable seal from wear on its internal surface and, thus, may prevent displacement of the repositionable seal.

As an alternative to pocketed seal carriers, and as another example, the one or more seal carriers and the repositionable seal collectively define both an external surface and an internal surface of the seal element. In these instances, the one or more seal carriers may be rearranged within the single groove to axially reposition the repositionable seal (e.g., along the downstream direction). Among other advantages, these seal carriers may be easy to replace since, in essence, the seal carriers operate independently of the repositionable seal and can be provided as modular components.

In any of the aforementioned embodiments, the repositionable seal may wear prior to the one or more seal carriers and, thus, the seal carriers may be reusable across configurations, or at least across some configurations. However, if the repositionable seal wears, repositioning the repositionable seal may include replacing the repositionable seal with a new repositionable seal of like dimensions during a repositioning.

Additionally, in some embodiments of the foregoing sealing assembly, the seal element is a monolithic component with the repositionable seal integrally formed therein. In such embodiments, the repositionable seal is axially repositionable (e.g., along the downstream direction) by replacing the seal element with a new seal element that includes a new seal in a new axial position. Among other advantages, the monolithic component may remove variability associated with multiple moving components and may be simple to install.

Still further, in some embodiments, the seal element is a first seal element and the sealing assembly also includes a second seal element sized to fit within the single groove. The second seal element is configured to replace the first seal element when fluid starts to leak through the repositionable seal and a first portion of the casing engaged with the repositionable seal. The second seal element also includes a second seal positioned within the single groove, but axially offset from the repositionable seal so that the second seal engages a second portion of the casing that is axially offset from (e.g., disposed downstream of) the first portion of the casing. In some of these embodiments, the seal assembly also includes a third seal element sized to fit within the single groove and configured to replace the second seal element when fluid starts to leak through the second seal and the second portion of the casing. The third seal element includes a third seal positioned within the single groove, but axially offset from the repositionable seal so that the third seal engages a third portion of the casing that is axially offset from (e.g., disposed downstream of) the second portion of the casing.

In accordance with additional embodiments, the present application is directed to a seal kit for a sealing assembly that is configured to seal a segment of a casing of a fluid end of a reciprocating pump, the sealing assembly including a closure element with a lateral surface that faces an interior wall of the segment, and the lateral surface including a single groove. The seal kit includes a first seal element and a second seal element that are each configured to be installed in the single groove. The first seal element includes a first seal positioned to seal against a first portion of the casing forming the segment. The second seal element includes a second seal positioned to seal against a second portion of the casing forming the segment, the second portion being axially offset from (e.g., downstream of) the first portion.

In some of these embodiments, the seal kit also includes a third seal element configured to be installed in the single groove. The third seal element includes a third seal positioned to seal against a third portion of the casing forming the segment, the third portion being axially offset from (e.g., downstream of) the second portion. The kit could also include more than three seal elements. Regardless of the number of seal elements included in a kit, any of the seal elements and/or the sealing assembly included in a kit may include any combination of the features and realize any advantages described above.

In accordance with yet additional embodiments, the present application is directed to a method of sealing an externally open segment of a fluid end of a reciprocating pump with a sealing assembly, the fluid end being driven by a power end. The method includes positioning a first seal element within a single groove disposed on a lateral surface of a closure element to form a first sealing assembly. Then, the first sealing assembly is installed in the externally open segment so that the lateral surface of the closure element faces an interior wall of the externally open segment. The first seal element includes a first seal positioned to seal against a first portion of the interior wall of the externally open segment when the sealing assembly is installed in the segment.

After installation, the power end is activated to cause fluid to flow through the fluid end. Eventually, the power end is deactivated and the first seal element is removed from the single groove. A second seal element is then positioned within the single groove on the lateral surface of the closure element to form a second sealing assembly and the second sealing assembly is then installed in the externally open segment. The second sealing assembly is installed so that the lateral surface of the closure element faces the interior wall of the externally open segment and the second seal element includes a second seal positioned to seal against a second portion of the interior wall of the externally open segment that is axially offset from (e.g., downstream of) the first portion of the interior wall. After this installation, the power end is reactivated to cause the fluid to flow through the fluid end. In different embodiments, any of the seal elements and/or the sealing assembly used in this method may include any combination of the features and realize any advantages described above. Additionally or alternatively, the method may utilize any kits described above.

In some embodiments, the method further includes deactivating the power end subsequent to reactivating the power end. Then, the second seal element can be removed from the single groove and a third seal element can be positioned within the single groove on the lateral surface of the closure element to form a third sealing assembly. The third sealing assembly can then be installed in the externally open segment so that the lateral surface of the closure element faces the interior wall of the externally open segment. The third seal element includes a third seal positioned to seal against a third portion of the interior wall of the externally open segment that is axially offset from (e.g., downstream of) the second portion of the interior wall.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

Like reference numerals have been used to identify like elements throughout this disclosure.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the sealing assembly presented herein provides a bore seal with an extended lifespan, at least as compared to conventional (e.g., stationary) bore seals. The sealing assembly provides an extended lifespan because a seal member included in the sealing assembly can be selectively/progressively positioned to seal against unworn surfaces. More specifically, over time, the seal member/seal ring can move/migrate axially upwards with respect to the remainder of the sealing assembly, sealing against surfaces that were previously unexposed to fluid for which the seal ring is providing a seal. As is detailed below, the seal ring is included in or coupled to a seal member that is installable within a single, extended seal groove formed in a closure element. Then, the seal member may be moved axially by reconfiguring the seal member and/or by selectively replacing the seal member.

Notably, since the sealing is achieved within a single groove, a closure element that supports the seal ring (e.g., a plug, cover, and/or sleeve) need not be extensively machined to form multiple grooves. This may save cost and/or time during manufacturing. Moreover, when a closure element includes multiple grooves, the grooves have to be adequately spaced to ensure that each groove is supported by enough material to avoid failure. That is, multiple grooves must be axially spaced along the closure element so that fin-like structures extending between the grooves are strong enough to support a seal against forces generated by high pressure acting on the seal. Moreover, since the techniques presented herein use a closure element with a single groove that supports multiple sealing locations, the same closure element (e.g., a plug, cover, and/or sleeve) can be re-used to achieve different sealing positions. By comparison, some solutions achieve different sealing positions with different closure elements, which wastes material and creates cost and inventory disadvantages for the end user, who must buy, track and maintain multiple closure elements.

Figure 1:
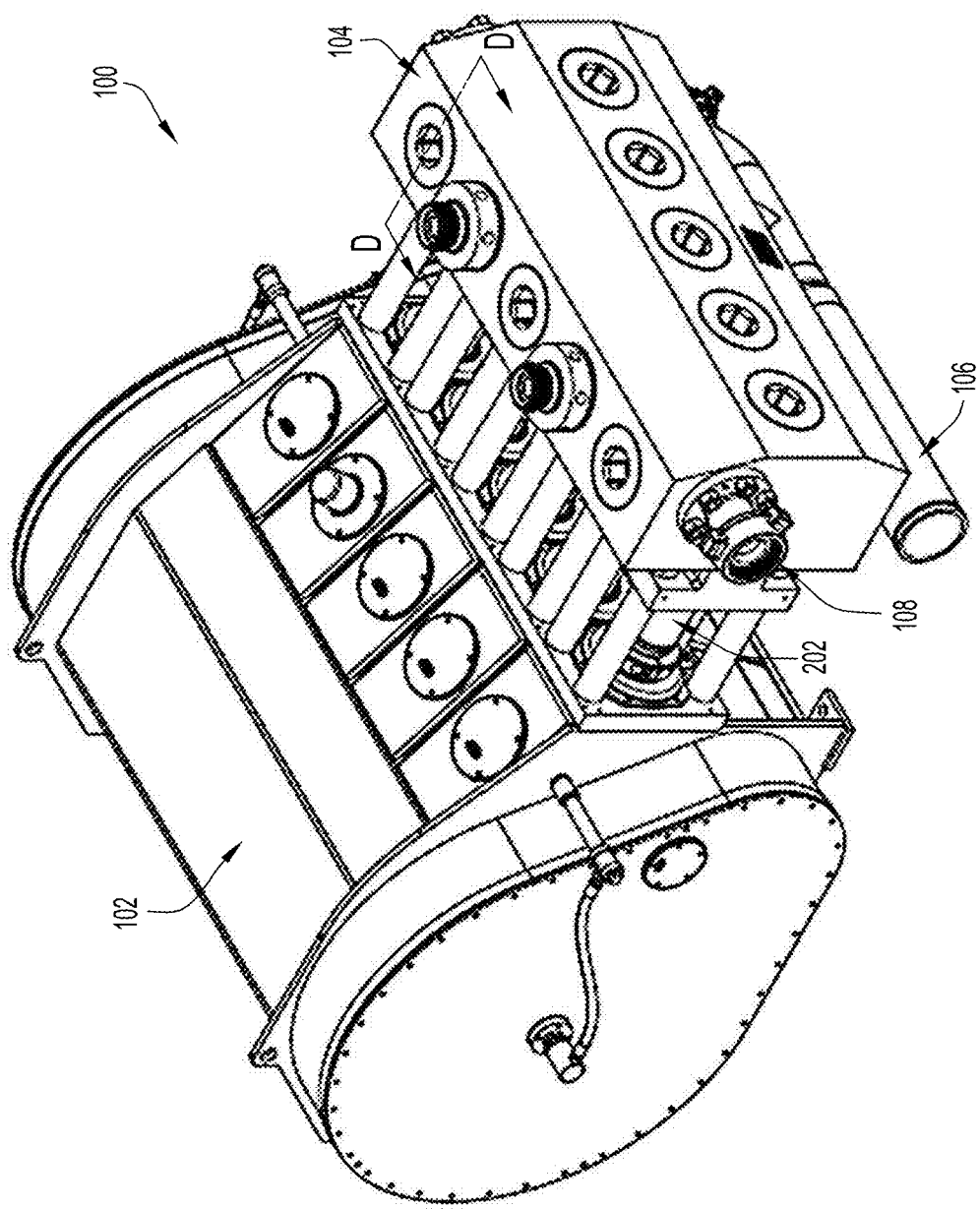
FIG. 1 is a perspective view of a reciprocating pump including a fluid end, according to an example embodiment.

Now referring to FIG. 1 for a description of an exemplary embodiment of a reciprocating pump 100 in which the sealing assembly presented herein may be included. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations.

Often, the reciprocating pump 100 may be quite large and may, for example, be supported by a semi-tractor truck ("semi") that can move the reciprocating pump 100 to and from a well. For example, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas. Consequently, any improvements that extend the lifespan of components of the reciprocating pump 100, especially typical "wear" components, and extend the time between maintenance operations (i.e., between downtime) are highly desirable.

Figure 2:
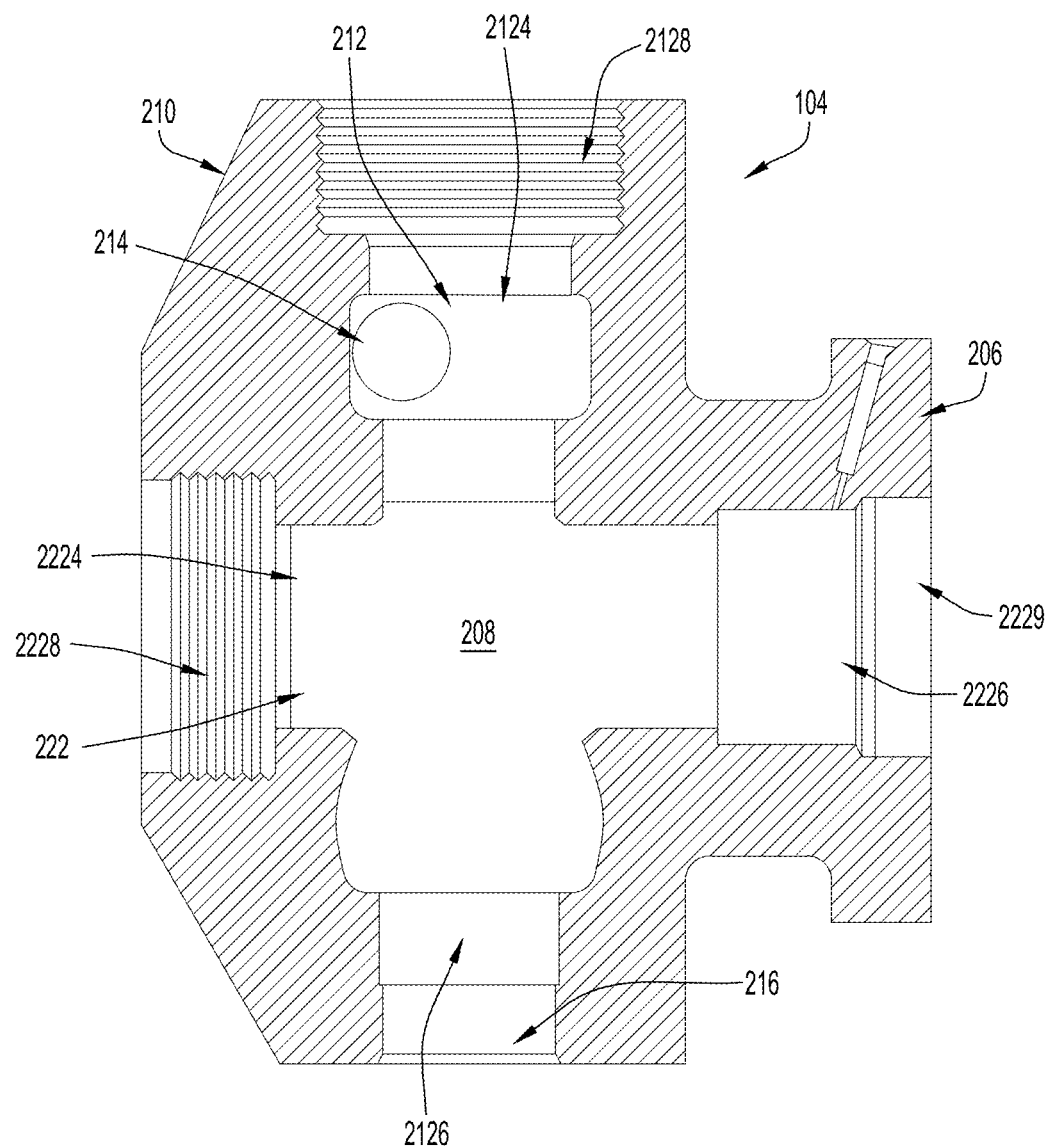
FIG. 2 is a cross sectional view taken along line D-D of FIG. 1.

FIG. 2 is a sectional view taken along line D-D of FIG. 1, which is representative of a central or plunger axis of one of the plungers 202 (see FIG. 1) included in reciprocating pump 100. In FIG. 2, the plunger is omitted; however, generally, the fluid end 104 forms a plurality of pumping chambers 208 and each chamber 208 includes a plunger that reciprocates within a casing 206 of the fluid end 104. With each stroke of the plunger 202, low pressure fluid is drawn into the pumping chamber 208 and high pressure fluid is discharged. Often, the fluid within the pumping chamber 208 contains abrasive material (i.e., "debris") that can damage seals formed in the reciprocating pump 100.

The pumping paths and pumping chamber 208 of the fluid end 104 are formed by conduits that extend through the casing 206 to define openings at an external surface 210 of the casing 206. More specifically, a first conduit 212 extends longitudinally (e.g., vertically) through the casing 206 while a second conduit 222 extends laterally (e.g., horizontally) through the casing 206. Thus, conduit 212 intersects conduit 222 to at least partially define the pumping chamber 208. As is illustrated, the diameters of conduit 212 and conduit 222 may vary throughout the casing 206 so that the conduits can receive various structures, such as sealing assemblies or components thereof.

Regardless of the diameters of conduit 212 and conduit 222, each conduit may include two segments, each of which extend from the pumping chamber 208 to the external surface 210. Specifically, conduit 212 includes a first segment 2124 and a second segment 2126 that opposes the first segment 2124. Likewise, conduit 222 includes a third segment 2224 and a fourth segment 2226 that opposes the third segment 2224. In the depicted embodiment, the segments of a conduit (e.g., segments 2124 and 2126 or segments 2224 and 2226) are substantially coaxial while the segments of different conduits are substantially orthogonal. However, in other embodiments, segments 2124, 2126, 2224, and 2226 may be arranged along any desired angle or angles, for example, to intersect pumping chamber 208 at one or more non-straight angles.

Still referring to FIG. 2, in the depicted embodiment, conduit 212 defines a fluid path through the fluid end 104. Segment 2126 is an intake segment that connects the pumping chamber to piping delivering fluid to the fluid end 104. Meanwhile, segment 2124 is an outlet segment that allows compressed fluid to exit the fluid end 104. Thus, in operation, segments 2126 and 2124 may include valve components (e.g., one-way valves) that allow segments 2126 and 2124 to selectively open. However, typically, valve components in the inlet segment 2126 may be secured therein by piping while valve components in outlet segment 2124 may be secured therein by a sealing assembly that, for example, is secured to and seals against an interior wall of casing 206 defining segment 2124.

On the other hand, conduit 222 defines, at least in part, a cylinder for plunger 202, and/or connects the casing 206 to a cylinder for plunger 202. Thus, reciprocation of a plunger in or adjacent to segment 2226 draws fluid into the fluid chamber 208 via inlet segment 2126 and pumps the fluid out of the fluid chamber 208 via outlet segment 2124. Segment 2224 is an access segment that provides access to parts and surfaces disposed or defined within casing 206. However, in some embodiments, conduit 222 need not include segment 2224 and conduit 222 may be formed from a single segment (segment 2226) that extends from the pumping chamber 208 to the external surface 210.

Still referring to FIG. 2, but now in combination with FIG. 1, although FIG. 2 depicts a single pumping chamber 208, it should be understood that a fluid end 104 can include multiple pumping chambers 208 arranged side-by-side. In some embodiments, the fluid end 104 may be modular and different casing segments may house one or more pumping chambers 208. Additionally or alternatively, multiple pumping chambers 208 may be formed in a single casing segment or casing. Regardless of how the casing 206 is formed, the one or more pumping chambers 208 included therein are arranged side-by-side so that corresponding conduits are positioned adjacent each other and generate substantially parallel pumping action.

In operation, fluid may enter fluid end 104 via multiple openings, as represented by opening 216 in FIG. 2, and exit fluid end 104 via multiple openings, as represented by opening 214 in FIG. 2. In at least some embodiments, fluid enters openings 216 via pipes of a piping system 106 (see FIG. 1), flows through pumping chamber 208 (due to reciprocation of a plunger 202), and then flows through openings 214 into a channel 108 (see FIG. 1). However, piping system 106 and channel 108 are merely example conduits and, in various embodiments, fluid end 104 may receive and discharge fluid via any number of pipes and/or conduits, along pathways of any desirable size or shape.

Figure 6A:
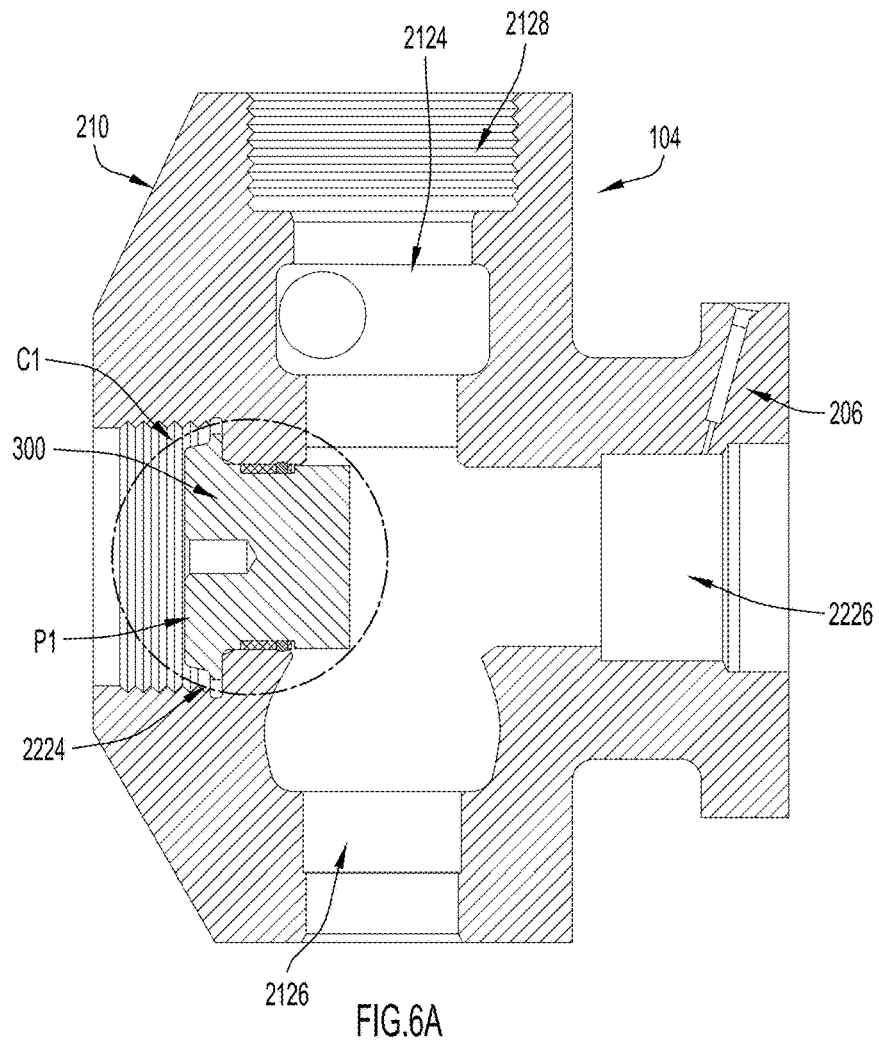
FIGS. 6A, 7A, and 8A are cross sectional views of the fluid end of FIG. 2 with a sealing assembly installed therein, the sealing assembly being disposed in a first configuration in FIG. 6A, a second configuration in FIG. 7A, and a third configuration in FIG. 8A.

Now referring to FIG. 2 in combination with FIG. 6A, during operations of pump 100, the first segment 2124 (of conduit 212), the third segment 2224 (of conduit 222), and the fourth segment 2226 (of conduit 222) may each be "closed" segments. By comparison, the second segment 2126 (of conduit 212) may be an "open" segment that allows fluid to flow from the external surface 210 to the pumping chamber 208. That is, for the purposes of this application, a "closed" segment may prevent, or at least substantially prevent, direct fluid flow between the pumping chamber 208 and the external surface 210 of the casing 206 while an "open" segment may allow fluid flow between the pumping chamber 208 and the external surface 210. To be clear, "direct fluid flow" requires flow along only the segment so that, for example, fluid flowing from pumping chamber 208 to the external surface 210 along segment 2124 and channel 108 does not flow directly to the external surface 210 via segment 2124.

Segment 2124 and segment 2224 may be each be completely capped, sealed, plugged, or otherwise closed to prevent fluid from passing through segment 2124 or segment 2224 to the external surface 210 of casing 206. This seal may be achieved with a closure element or sealing assembly 300. Meanwhile, a "sleeve" version of sealing assembly 300 segment 2226 may be an annular version of sealing assembly 300 that extends between casing 206 and a plunger 202 extending there through. For simplicity, the Figures (e.g., FIG. 6A) only show a sealing assembly positioned in segment 2224, but segment 2124 may also receive any embodiment of sealing assembly 300 and/or segment 2226 may also receive a modified version (e.g., annular version) of any embodiment of sealing assembly 300. In fact, in some instances, a sealing assembly 300 disposed in segment 2124 may be referred to as a discharge plug, a sealing assembly 300 disposed in segment 2224 may be referred to as a suction plug, and a sealing assembly 300 disposed in segment 2226 may be referred to as a plunger sleeve.

During setup/servicing of the fluid end 104, seal assemblies 300 may be inserted into segment 2124, segment 2224, and segment 2226. Then, retaining elements (see, e.g., retaining element 600 of FIG. 10, and also referred to as lock members, retaining nuts, etc.) may be installed exteriorly of each sealing assembly 300 to secure the sealing assembly 300 therein. In the depicted embodiment, segment 2124, segment 2224, and segment 2226 include threads 2128, threads 2228, and threads 2229, respectively, disposed adjacent the external surface 210 of the casing 206. Thus, a retaining element may be threaded into place to secure a sealing assembly into segment 2124, segment 2224, or segment 2226.

However, in other embodiments, seal assemblies 300 may be secured in segment 2124, segment 2224, and/or segment 2226 via any desired techniques, e.g., with fasteners, pressure, and/or additional closure components, either in addition to or in lieu of threaded retaining elements, provided that the techniques allow the seal assemblies 300 to be removed for reconfiguration or replacement, pursuant to the techniques detailed below. That is, seal assemblies 300 may be installed in segment 2124, segment 2224, and segment 2226 with the same or different techniques, structures, etc., but the seal assemblies 300 should each be removable from their segment to allow for servicing of the seal assemblies 300 and/or to allow for servicing of components/parts sealed inside the casing 206 by the sealing assembly 300 (e.g., one-way valves, the casing itself, etc.). As an example, in some embodiments, the seal assemblies 300 may be threaded into engagement with threads on the casing 206, either in addition to or in lieu of threaded retaining elements.

Figure 3:
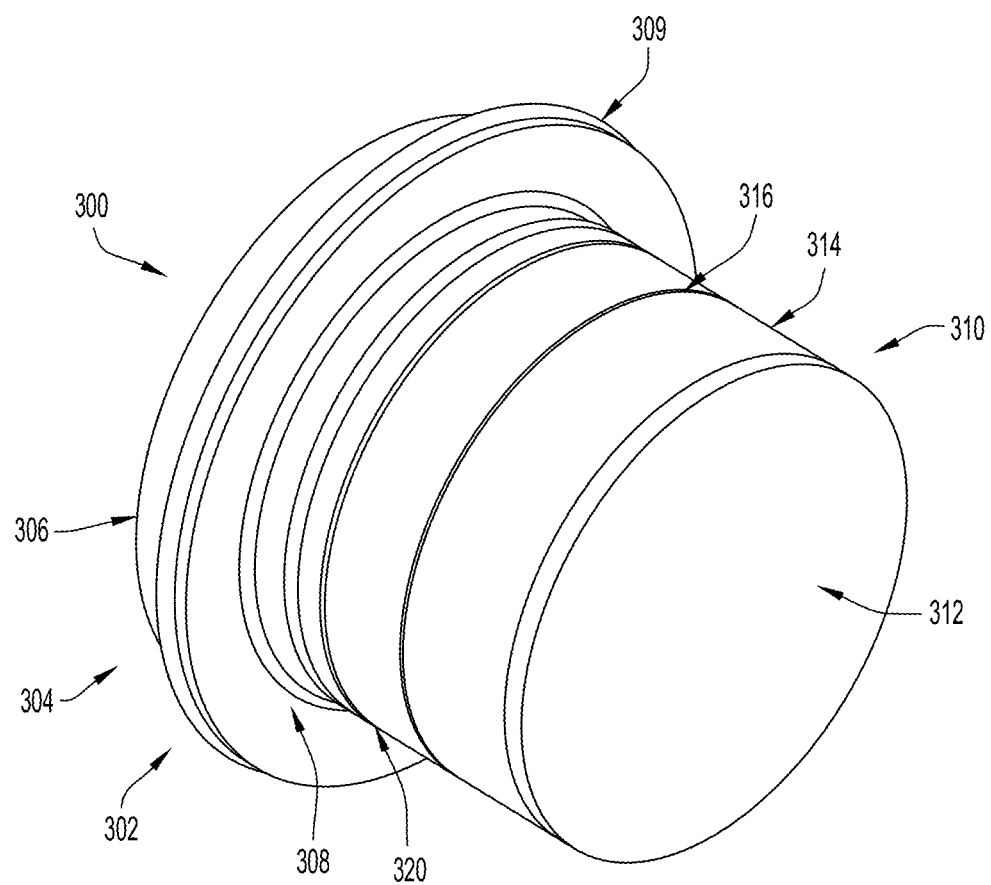
FIG. 3 is a perspective view of a first example embodiment of the sealing assembly presented herein.

Now turning to FIG. 3, the sealing assembly 300 presented herein includes a closure element 302 and a seal element 320 (which may also referred to as a seal subassembly 320). In the depicted embodiments, the closure element 302 is illustrated as a plug; however, as mentioned, closure element 302 may be in the form of a plug/cover or a sleeve. Regardless, the closure element 302 has a substantially circular, or at least ovular, cross-sectional outer shape that is configured to substantially mate with a segment for which it is intended (e.g., segment 2124, segment 2224, or segment 2226). In the depicted embodiment, the exterior of the closure element 302 has multiple steps/diameters defined by a flange 304 and a sealing portion 310.

Specifically, the flange 304 extends from a top or proximal surface 306 to a bottom or distal surface 308 while overhanging the sealing portion 310. Thus, when the sealing assembly 300 is inserted into a segment (e.g., segment 2124, segment 2224, or segment 2226), the flange 304 may sit on a seat defined by the segment, limiting axial displacement of the sealing assembly within a segment. In some embodiments, seal assemblies may be specifically designed for specific segments, for example, by dimensioning flange 304 to engage a seat of a specific diameter/dimensions.

Figure 10:
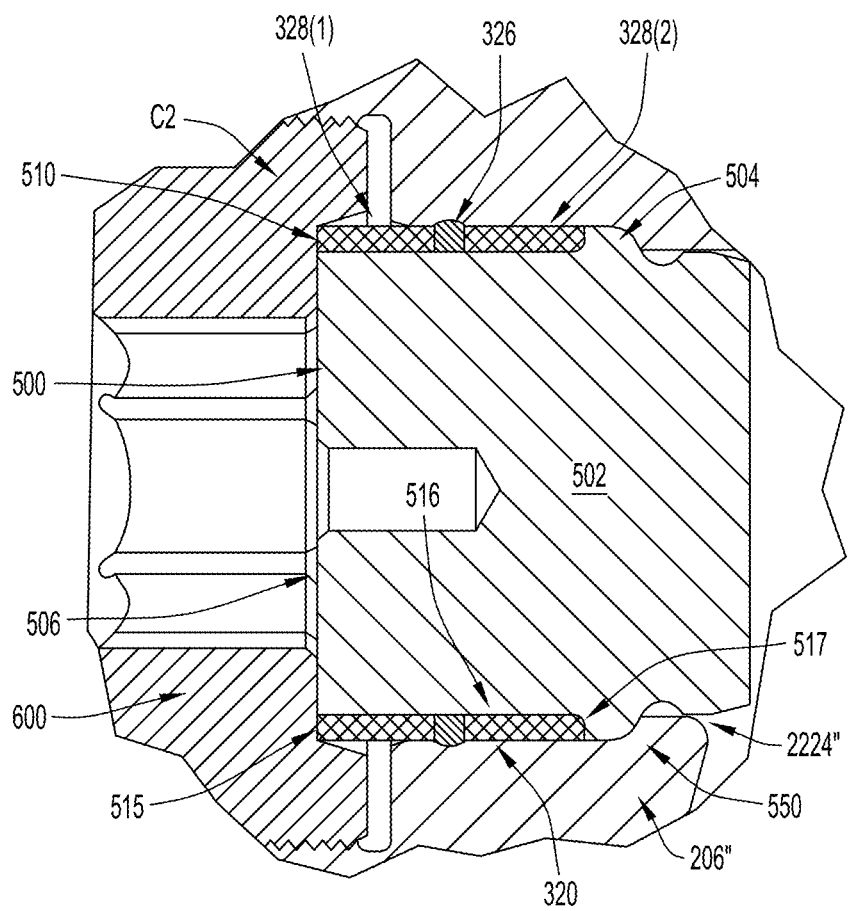
FIG. 10 is a side sectional view of a third example embodiment of the sealing assembly presented herein.

In the depicted embodiments, the proximal surface 306 of the flange 304 may include a cavity 307 (see, e.g., FIG. 6B) that may facilitate installation and/or create resilience for sealing. Additionally, in the depicted embodiments, an external radial surface (i.e., a side, outer surface) of flange 304 may be sloped or angled towards a radially extending lip 309 (shown best in FIGS. 3 and 6B) to encourage sealing and/or engagement with a retaining element (e.g., a retaining nut, an example of which is shown in FIG. 10 as retaining element 600). However, in various embodiments, the flange 304 may include any other features, in combination with one, none, or both of the cavity 307 and lip 309 for any desirable reason (e.g., sealing, installation, engagement with a retaining element, etc.).

Still referring to FIG. 3, the sealing portion 310 is generally configured to receive the seal element 320 and to form one or more seals against a casing segment within which the sealing assembly 300 is installed (e.g., segment 2124, segment 2224, or segment 2226). However, before discussing these features, it is important to understand the terms "upstream" and "downstream." Any fluid flow through casing 206 flows through pumping chamber 208 and may contact a bottom or distal end of a sealing assembly 300 that forms a seal that closes a segment (e.g., to prevent flow between the pumping chamber 208 and the external surface 210 of the casing 206). Thus, if a first component (e.g., a wall, surface, or portion) is described as being "upstream" of a second component (e.g., another wall, surface, or portion) the first component will be closer to the fluid flow (and high pressures associated therewith) than the second component (i.e., closer to pumping chamber 208). On the other hand, if a first component is described as being "downstream" of a second component, the first component will be closer to the external surface 210 of the casing 206 (and the relatively low pressures associated therewith) than the second component.

Now, as can be seen in FIG. 3, a sealing portion 310 extends from the distal surface 308 of the flange 304. In the depicted embodiments, the sealing portion 310 is substantially cylindrical, insofar as the term "substantially" indicates that edges of the cylinder may be rounded, chamfered, or otherwise non-right angled. However, as is discussed in further detail below, the sealing portion 310 need not be substantially cylindrical. In any case, the sealing portion 310 includes at least one lateral surface 314 that terminates at a distal surface 312. A groove 316 is formed in the at least one lateral surface 314, between the flange 304 and the distal surface 312 of the sealing portion 310, and the groove 316 is shaped and sized to receive, and potentially to retain, the seal element 320.

Figure 4A:
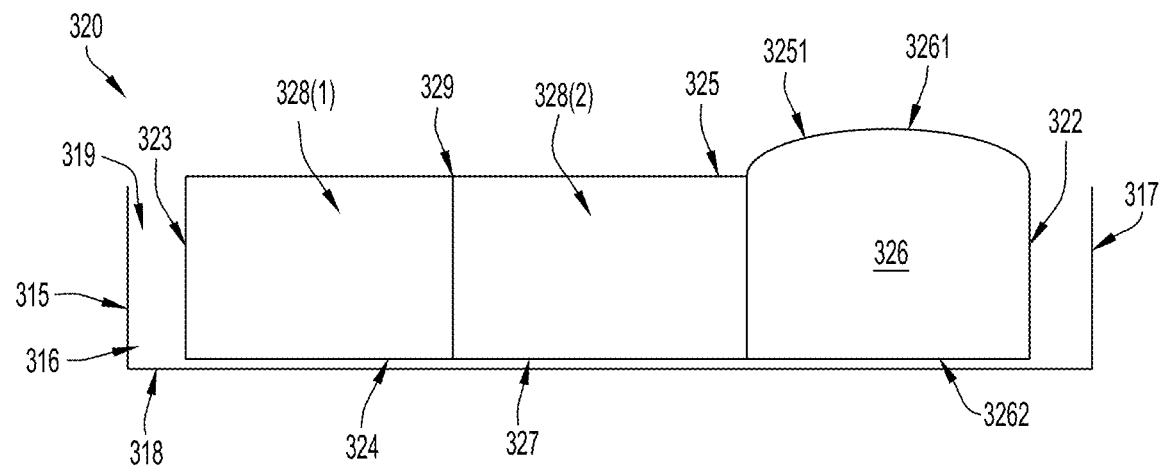
FIGS. 4A and 4B are schematic illustrations of sectional views of seal elements that may be included in the sealing assembly of FIG. 3, according to first and second example embodiments. Each of the seal elements is depicted within a groove of a closure element of the sealing assembly presented herein.
Figure 4B:
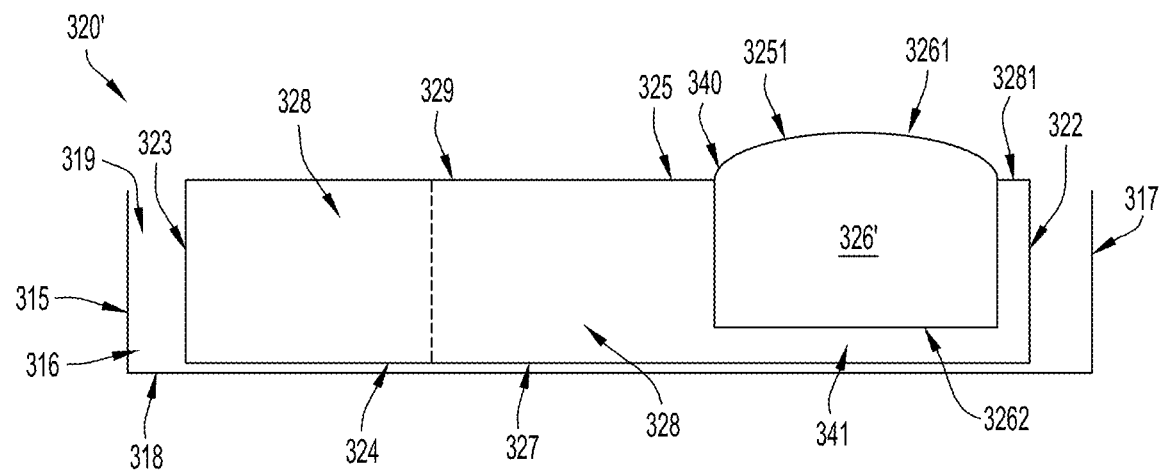

More specifically, as is illustrated by a combination of FIGS. 3, 4A and 4B, the groove 316 is an annular groove bounded by a proximal or "downstream" wall 315 and a distal or "upstream" wall 317. Walls 315 and 317 each extend between the lateral surface 314 and an inwardly offset surface 318 that is disposed radially inwards of the lateral surface 314. Thus, groove 316 defines an annular space 319 for seal element 320, which is an annular component and, thus, may be described as a ring. However, despite the nomenclature "inwardly offset surface 318," groove surface 318 need not be inwardly offset from the entire lateral surface 314 of the sealing portion 310. For example, in other embodiments, the lateral surface 314 may not extend orthogonally from the flange 304 and the inwardly offset surface 318 may be inwardly offset from only a portion of the lateral surface 314. More specifically, if a casing segment is sloped or stepped, the lateral surface 314 may be shaped to mate/match the casing segment and the inwardly offset surface 318 may be disposed radially inward of some portions of the lateral surface 314, but radially outward of or intersecting with other portions of the lateral surface 314.

In at least some embodiments, the groove 316 is configured to removably receive a seal element 320 (and multiple seal elements 320 over time). That is, the seal element 320 may be removably coupled to the closure element 302 via groove 316. For example, the seal element 320 may have some elasticity and/or resiliency so that the seal element 320 can be slid over the distal surface 312 of the sealing portion 310 and into groove 316. Additionally or alternatively, the seal element 320 may also be skive cut to facilitate sliding/stretching. Then, this elasticity and/or resiliency may bias the seal element 320 inwards against the inwardly offset surface 318 of groove 316 (of closure element 302) once the seal element 320 is disposed within groove 316. That is, a resiliency or elasticity of the seal element 320 may create inwards pressure that removably couples the seal element 320 to the groove 316 of the closure element 302. Then, when a seal created by the seal element 320 begins to fail, the seal element 320 may be slid over the distal surface 312 of the sealing portion 310 to remove and replace or reconfigure the seal element 320.

However, in other embodiments, the seal element 320 need not be resiliently biased against the inwardly offset surface 318 of the groove 316 and could, for example, sit within groove 316 without creating pressure there against. In such embodiments, walls 315 and 317 could retain the seal element 320 within groove 316. Then, during operations, the downstream wall 315 may prevent axial movement of the seal element 320 along an entire length of the sealing portion 310 and, may, for example, convert downstream axial movement into radial compression against a casing 206. However, to be clear, downstream wall 315 could also retain a seal element 320 that is biased against the inwardly offset surface 318 by its resiliency/elasticity. Additionally or alternatively, insertion of the sealing assembly 300 into a segment of the casing 206 (e.g., segment 2124, segment 2224, or segment 2226) may generate compressive forces that removably couple the seal element 320 to the closure element 302.

Still further, in some embodiments, the seal element 320 may be irremovably coupled (e.g., integrally formed with or bonded to) to the closure element 302. Thus, the sealing assembly 300 may be a unitary or monolithic component. However, in such embodiments, when a seal formed by the seal element 320 begins to leak/fail, the entire sealing assembly 300 will need to be replaced.

Now turning to FIGS. 4A and 4B, these two figures depict two embodiments of seal elements—seal element 320 and seal element 320'— that can be included in a sealing assembly 300 presented herein. However, to be clear, FIGS. 4A and 4B are diagrammatic/schematic illustrations of a groove 316 and a seal element and do not necessarily depict accurate dimensions/relationships of these features. For example, although FIGS. 4A and 4B depict gaps between seal elements 320/320' and each of downstream wall 315, upstream wall 317, and inwardly offset surface 318, most, if not all, embodiments of sealing assembly 300 do not have such gaps, at least during operation of a fluid end 104 in which the sealing assembly 300 is installed. Instead, these gaps are included so that the groove 316 and seal elements 320/320' can be clearly labeled and described.

Moreover, FIGS. 4A and 4B depict similar embodiments with many like parts and are labeled with many like numerals. Thus, any such description of like parts should be understood to apply to both embodiments unless otherwise explicitly stated. As an example of a similarity, seal elements 320 and 320' each extend from a downstream end 323 to an upstream end 322. Although these ends are defined by different portions of elements 320 and 320', in both embodiments, the seal elements 320 and 320' have an overall length that: (1) positions the downstream end 323 of the seal element adjacent to, if not abutting, the downstream wall 315 of the groove 316; and (2) positions the upstream end 322 of the seal element adjacent to, if not abutting, the wall 317 of the groove 316.

Seal elements 320 and 320' each also include an internal surface 324 that abuts the inwardly offset surface 318 of groove 316 when one of the seal elements 320 and 320' is installed in the groove 316. Likewise, in the depicted embodiments, seal elements 320 and 320' each include an external surface 325 that includes or defines at least one protruding seal 3251 while otherwise extending across the groove 316 at a height that is approximately equal to a height/depth of the groove 316. That is, aside from the protruding seal 3251, the depicted external surfaces 325 are substantially aligned with the tops of walls 315 and 317. However, in other embodiments, the external surface 325 of seal element 320, seal element 320', or any other embodiment thereof, may be disposed above or below the tops of walls 315 and 317 and may be linear, sloped, or shaped in any other desirable manner.

In FIG. 4A, the exterior surfaces of seal element 320 (e.g., downstream end 323, upstream end 322, internal surface 324, and external surface 325) are defined by three components: a first seal carrier 328(1), a second seal carrier 328(2), and a seal ring 326. In the depicted embodiment, seal carriers 328(1) and 328(2) are identical components and each define a flat exterior surface 329 and a flat interior surface 327 that is parallel to the exterior surface 329. The seal ring 326 also includes an internal surface 3262 and an external surface 3261. The external surface 3261 defines the at least one protruding seal 3251.

More specifically, the external surface 3261 of the seal ring 326 protrudes above, but transitions smoothly from, the flat exterior surfaces 329 of seal carriers 328(1) and 328(2) to define the at least one protruding seal 3251. However, collectively, external surfaces 329 and 3261 define the external surface 325 of the seal element 320. Meanwhile, the internal surface 3262 of the seal ring 326 aligns with the flat interior surface 327 of seal carriers 328(1) and 328(2) to define the flat internal surface 324 of the seal element 320. That said, in other embodiments, the seal element 320 can be formed from separate elements of different shapes and sizes, with or without defining a flat internal surface 324 and/or an external surface 325 with a flat surface that smoothly transitions to a protruding seal 3251, provided at least one at least one protruding seal 3251 is defined.

By comparison, in FIG. 4B, the exterior surfaces of seal element 320' (e.g., downstream end 323, upstream end 322, internal surface 324, and external surface 325) are defined by two components: a pocketed seal carrier 328, and a seal ring 326'. Again, the external surface 3261 of the seal ring 326' protrudes above, but transitions smoothly from, the flat exterior surface 329 of the seal carrier 328 while surfaces 329 and 3261 collectively define an external surface 325 of the seal element 320 with at least one protruding seal 3251. However, now, the seal ring 326' sits within a pocket 340 defined by the seal carrier 328 so that the seal carrier 328 supports and/or carries the seal ring 326'. Thus, the internal surface 3262 of the seal ring 326' sits above an elongate section 341 of the seal carrier 328 and a flat, internal surface 324 of seal carrier entirely defines the flat interior surface 327 of the seal element 320'. That is, the internal surface 3262 of the seal ring 326' abuts the seal carrier 328 and the seal carrier 328 abuts the inwardly offset surface 318.

Additionally, in FIG. 4B, the seal carrier 328 includes a wall 3281 upstream of the seal ring 326'. Thus, the seal carrier 328 substantially encapsulates three sides of the seal ring 326'. However, in other embodiments, a "pocketed" seal carrier 328 may only border two sides of the seal ring 326' and, for example, the upstream side of the seal ring 326' may engage the upstream wall 317 of groove 316. Indeed, the embodiments depicted in FIGS. 4A and 4B are merely examples and features of one embodiment may be modified and/or combined with features of another embodiment. For example, the seal carrier 328 of FIG. 4B may be formed from two seal carrier components, with a first component resembling seal carriers 328(1) and 328(2) and a second component including the elongate section 341 and one, two, or no walls (an example division is illustrated by a dashed line in FIG. 4B).

Additionally or alternatively, any of seal carriers 328, 328(1), and 328(2) can be formed from or replaced by any number of seal carriers, of any lengths. In fact, seal carriers of shorter lengths may add more granularity to the seal placement options. Put another way, with the sealing assembly 300 presented herein, the extended groove 316 accommodates any number of sealing positions along an axial dimension (e.g., "length") of the groove 316 and these positions may achieved with one or more seal carriers of any size and seals of any size. For example, a seal 326 might be able to move axially downstream or axially upstream in minimal axial increments of ⅛ inches. Thus, a number of possible arrangements may be determined based primarily on the length of the bore segment and the length of the groove 316. By comparison, as mentioned above, closure elements with multiple grooves must include fin-like structures between grooves and thickness limitations imposed on these fin-like structures limit the number of sealing positions, as well the placement of sealing positions, that can be achieved along a certain bore length.

Finally, but perhaps most importantly, in FIGS. 4A and 4B, the at least one protruding seal 3251 is illustrated proximate, if not adjacent (i.e., abutting) the upstream wall 317 of groove 316, but this position is merely an example of a first position and should not be understood to be limiting in any way. As is described in detail below, groove 316 is long enough to accommodate seal elements 320/320' in different configurations that dispose the seal element 320/320' in different axial locations along the length of the groove 316. For example, seal element 320 could be reconfigured to place the seal ring 326: (a) at the upstream end of groove 316, proximate or adjacent upstream wall 317, with seal carriers 328(1) and 328(2) downstream of seal ring 326; (b) at the downstream end of groove 316, proximate or adjacent downstream wall 315, with seal carriers 328(1) and 328(2) upstream of seal ring 326; or (c), in a middle portion of groove 316, with seal carriers 328(1) and 328(2) upstream and downstream of seal ring 326, respectively, sandwiching seal ring 326. Reconfiguring and/or replacing the seal element may move the seal element axially within the seal ring, such as by moving the seal element axially downstream through these positions.

Additionally or alternatively, different sets or kits of seal rings can be manufactured to locate the seal ring 326' in different axial locations, e.g., by creating the pocket 340 in different axial locations. Thus, in some embodiments, the seal ring 326 may be moved axially by switching locations of pieces/parts of the seal ring. Additionally or alternatively, at least a portion of the seal element can be replaced to reposition the seal ring. Indeed, if the seal ring 326/326' wears out while in a first axial position (e.g., adjacent or proximate upstream wall 317), seal ring 326/326' will need to be replaced regardless of whether pieces of the seal element 320/320' can be reconfigured to change the axial position of the seal ring 326/326'.

Figure 5B:
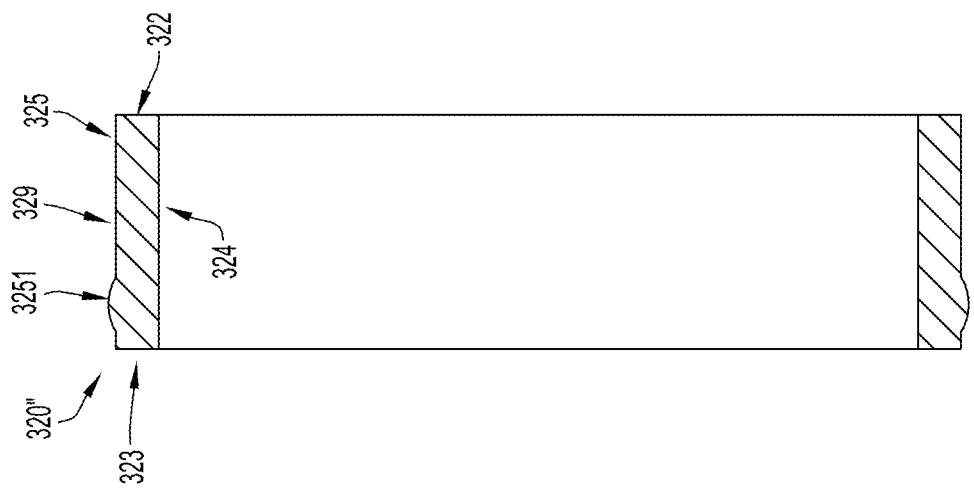
FIGS. 5A and 5B are perspective and side sectional views, respectively, of a seal element that may be included in the sealing assembly of FIG. 3, according to a third example embodiment.
Figure 5A:
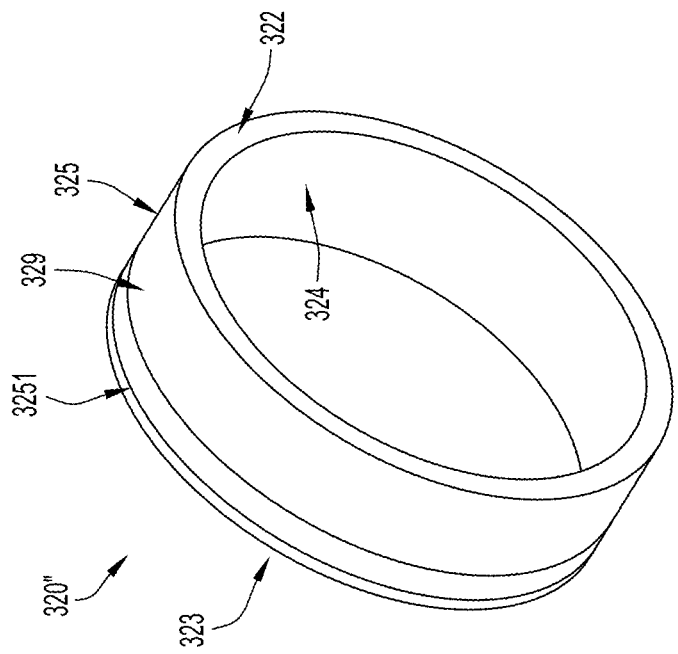

Now turning to FIGS. 5A and 5B, as yet another non-limiting example, in some instances, seal element may be a single, unitary component. Seal element 320" illustrates an example one-piece embodiment. Aside from its one-part construction, seal element 320" is substantially similar to seal element 320 and 320'. Thus, like parts are again labeled with like numerals and any such description of like parts included herein should be understood to apply to seal element 320" unless otherwise explicitly stated.

The most notable difference between seal elements 320, 320', and 320" is perhaps one of perspective. Since seal element 320" is a one-piece seal element, an exterior surface 329 of seal element defines at least one protruding seal 3251 and a flat external surface 325 instead of being defined by these surfaces. However, that said, seal element 320" still includes at least one protruding seal 3251, an internal surface 324 configured to engage an inwardly offset surface 318 of a groove, an upstream end 322 that is positionable proximate or adjacent the upstream wall 317 of the groove 316, and a downstream end 323 that is positionable proximate or adjacent the downstream wall 315 of the groove 316. Moreover, for the purposes of this application, the portions of seal element 320" adjacent seal 3251 (e.g., the portion between surfaces 324 and 325 and/or the portion downstream of seal 3251) may be referred to as seal carriers, even though they are formed integrally with the seal 3251.

To reiterate, although FIGS. 5A and 5B depict the at least one protruding seal 3251 proximate the downstream end 323 of the seal element 320", this position is merely an example of one possible seal position (e.g., a last position) and should not be understood to be limiting. However, notably, since seal element 320" is a one-piece part, seal element 320" does not include a removable/repositionable seal ring. Thus, to move the at least one protruding seal 3251 axially along the length of a groove 316, the seal element 320″ is replaced with a seal element 320″ that has the at least one protruding seal 3251 in a different axial position (e.g., so that the seal 3251 moves in a downstream or upstream direction over time). That said, the different axial positions can still be achieved within a single groove 316, which provides cost savings (e.g., due to less machining) and spacing advantages as compared to solutions that use a closure element with multiple grooves.

Still further, and now referring generally to at least FIGS. 4A, 4B, 5A, and 5B, while the seal elements presented herein are largely described as having a protruding seal, this description should not be understood to mean that other portions of the seal elements do not or cannot form a seal. For example, in some embodiments, seal 3251 and/or the seal ring 326/326′ defining this seal 3251 is/are formed from a soft sealing component, such as rubber, and other portions of the seal element are formed from a comparatively harder material, such as plastic, that may still be able to seal against the casing 206. Thus, in some embodiments and/or configurations, the seal elements presented herein may form a stack of seals, e.g., with at least some seals "backing up" seal 3251.

In the embodiments of FIGS. 4A and 4B, these different materials may be incorporated into a single seal element 320 by manufacturing portions of the seal element 320/320′ from different materials. Then, the different portions may be stacked in the groove 316, removably coupled together, and/or fixedly coupled together. By comparison, in the embodiments of FIGS. 5A and 5B, these different materials may be incorporated into a single seal element 320 with manufacturing processes capable of forming a single piece with two different materials, such as overmolding techniques. In some instances, these manufacturing processes may also be used to form the seal element embodiments of FIGS. 4A and 4B, or at least portions thereof.

Now turning to FIGS. 6A, 6B, 7A, 7B, 8A, and 7B, these Figures illustrate an example method of using the sealing assembly 300 presented herein to movably and/or progressively seal an externally open segment of a fluid end 104. For simplicity, these Figures only illustrate movably and/or progressive sealing of segment 2224 (e.g., progressive sealing with a suction plug). Generally, the movably and/or progressive sealing is achieved by moving a repositionable seal axially along a downstream direction within a single groove 316 of the closure element 302. Thus, over time, the repositionable seal (or replacement seals therefor) engages different, non-worn portions of the casing 206, allowing for better sealing over time (e.g., over the life of the fluid end).

However, the sealing progression illustrated in FIGS. 6A, 6B, 7A, 7B, 8A, and 7B is merely an example and the seal can move axially within a single groove in any desired manner, including progressively upstream, by moving to positions that vary upstream and downstream movement, etc. That, is, although 6A, 6B, 7A, 7B, 8A, and 7B illustrate a seal moving progressively downstream, this is merely one example of axial movement and any description of progressive downstream seal movement included in this application should not be understood to limit the seal movement pattern in any way.

Indeed, regardless of how the seal position moves within a single groove 316 over time (e.g., progressively upstream, progressively downstream, or any other axial movement pattern), the closure element 302 need not include multiple grooves (which may be difficult to machine) and can include multiple seal positions over a small section of the casing 206 (e.g., seal positions that are very close together). Moreover, even though progressive downstream axial movement of the seal may protect progressive sealing positions from exposure to pumped fluid and debris, moving the seal position upstream may still seal against unworn sections of the casing since wear often focuses at the point at which a seal is formed (e.g., wear is often localized at the point of contact between a seal element and a casing). Thus, moving the seal axially upstream may still achieve seal advantages described herein in connection with moving a seal axially downstream.

Figure 6B:
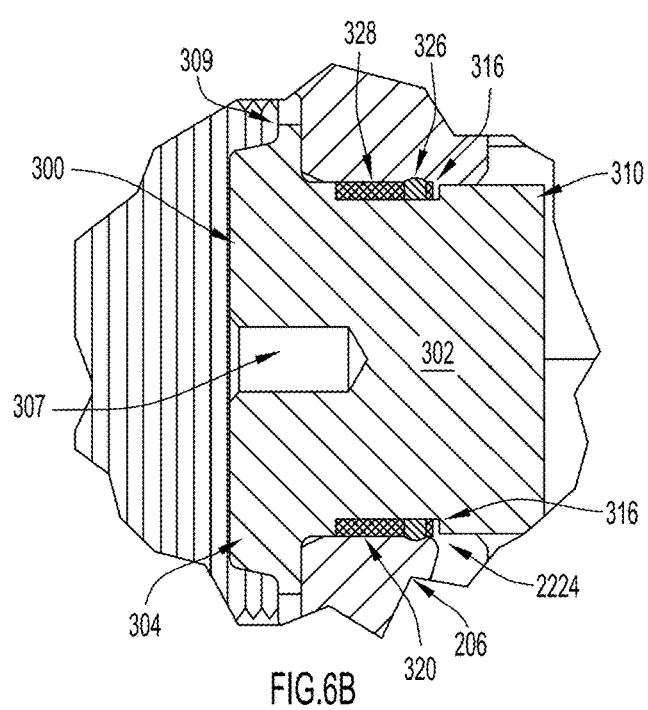
FIGS. 6B, 7B, and 8B are enlarged view of the sealing assemblies of FIGS. 6A, 7A, and 8A, respectively.

FIGS. 6A and 6B illustrate the fluid end 104 prior to a first activation. As can be seen, prior to a first activation, a seal element 320 with a seal ring 326 disposed at, or at least proximate to, an upstream end of groove 316 is installed onto the closure element 302. That is, initially, the sealing assembly 300 is formed by installing a seal element 320 configured in a first configuration C1 onto the closure element 302.

As an example of a seal assembly 300 configured in the first configuration C1, FIG. 6B illustrates the sealing assembly 300 with a seal ring 326 mounted in a pocket of a seal carrier 328 that defines the pocket at, or at least proximate to, an upstream end of groove 316 on the closure element 302 However, in other embodiments, a monolithic seal element 320″ with at least one protruding seal 3251 disposed at, or at least proximate to, an upstream end of groove 316 could be installed on closure element 302. As another alternative, two or more seal carriers, such as seal carriers 328(1) and/or 328(2), could be installed into groove 316 and a seal ring 326 could be installed as the final, upstream ring of the seal element 320.

Regardless of how the seal element 320 is formed, once the seal element 320 is installed on the closure element 302 in a first configuration C1, the sealing assembly 300 can be installed in an externally open segment (i.e., a segment open to external surface 210), which is segment 2224 in the depicted embodiment. For example, the sealing assembly 300 may be pressed or pushed into segment 2224 into a secure position P1. In at least some embodiments, including the depicted embodiment, the sealing assembly 300 is in the secure position P1 when a flange 304 of the sealing portion 310 sits on a set of the segment. Then, the sealing assembly 300 may be secured therein by a locking element (not shown).

When the sealing assembly 300 is in the secure position P1, the lateral surface 314 of the sealing portion 310 of the closure element 302 faces an interior wall of the externally open segment (e.g., segment 2224). Thus, installing the sealing assembly 300 in an externally open segment positions the seal ring 326 to seal against a first portion of an interior wall of the externally open segment (e.g., segment 2224). This closes the segment and prevents pumped fluid from traveling to the external surface 210 of the casing 206 via the segment.

Once all segments of the fluid end 104 are closed or connected to the appropriate piping/conduits (with the sealing techniques presented herein or other techniques), a power end of the reciprocating pump may be activated. Activating the power end drives pistons to pump fluid through the fluid end 104. That is, activating the power end pumps abrasive fluid through pumping chamber 208 in a cyclical fashion. But, over time, abrasive elements (e.g., sand) can get wedged between seal components (e.g., seal ring 326 and the metal casing 206) and/or remove metal from the casing 206 and cause seal to leak or fail. If these seals fail, a high pressure stream of fluid can exit the fluid end, which is dangerous for operators, the overall pump, and potentially for the environment. Thus, over time, users monitor the fluid end 104 for leakage or other signs of deterioration. The sealing assembly 300 may also be examined when other parts of fluid end 104 are serviced.

Figure 7A:
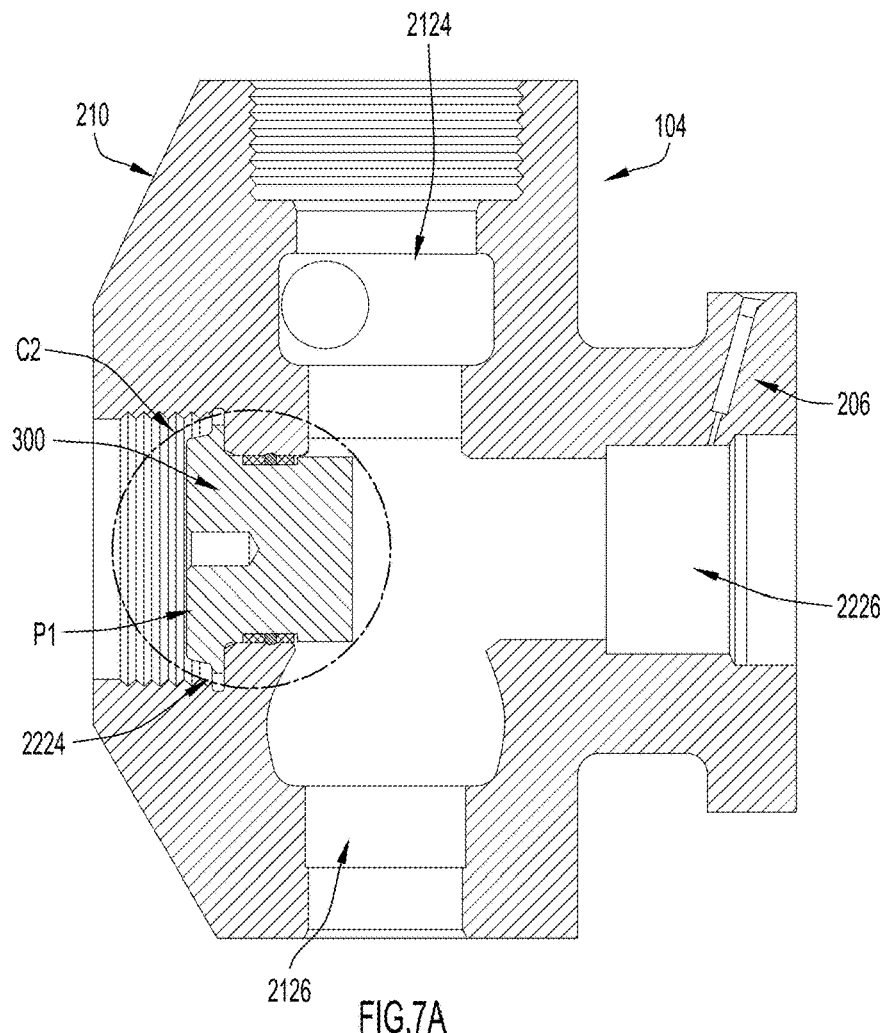
Figure 7B:
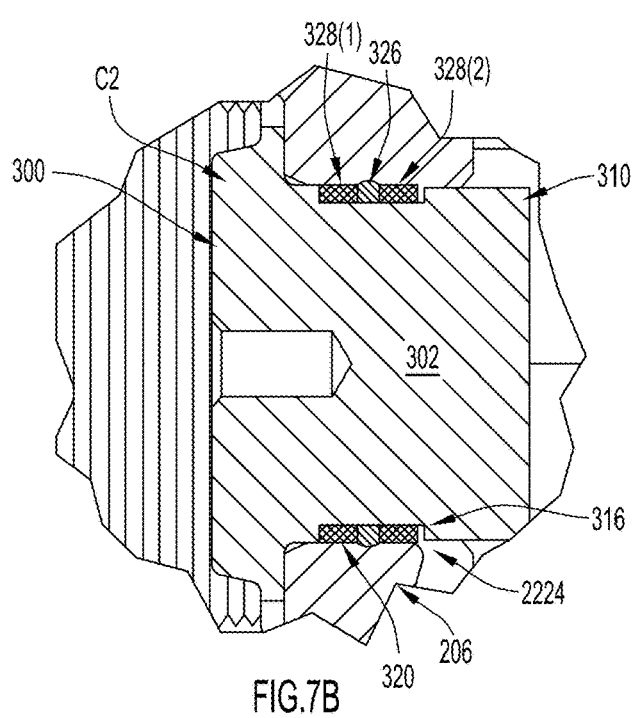

When it comes time to change the sealing assembly 300, the power end is deactivated. Then, the sealing assembly 300 can be removed from its segment (e.g., segment 2224) and the seal element 320 can be reconfigured to a second configuration C2, as is shown in FIGS. 7A and 7B. Alternatively, in some embodiments, it may be possible to reconfigure the seal element 320 to a second configuration C2 while the sealing assembly 300 is installed in a segment (e.g., segment 2224).

As can be seen in FIGS. 7A and 7B, when the seal element 320 is reconfigured to a second configuration C2, the seal element 320 is still positioned with the single groove 316, but now the seal ring 326 is positioned in a central axial position. More specifically, in the depicted embodiment, the seal ring 326 is positioned about halfway between the upstream and downstream ends of the groove. However, in other embodiments, the seal ring 326 may be positioned closer to end or the other when in the second configuration, provided that the position is axially downstream of the position of the seal ring 326 in the first configuration C1 to achieve this particular axially downstream progression. Thus, when the sealing assembly 300 is reinstalled in segment 2224 in position P1 (the same position as FIG. 6A) with the seal element 320 in the second configuration C2, the seal ring 326 will be positioned to seal against a second portion of the interior wall of segment 2224 that is downstream of the portion engaged by the seal ring 326 in the first configuration C1.

As an example of a seal assembly 300 configured in the second configuration C2, FIG. 7B illustrates the sealing assembly 300 being configured in the second configuration C2 by positioning a seal ring 326 between a first seal carrier 328(1) and a second seal carrier 328(2). However, in other embodiments, the seal element 320 could be configured in the second configuration C2 by positioning the seal ring 326 in a pocket 340 of a seal carrier 328 that defines the pocket in a position downstream of the first seal position (e.g., in a central position). That is, a seal carrier 328 may include an elongate section 341 extending between two rectangular sections to position a seal ring 326' in a position downstream of the first seal position. Still further, in other embodiments, sealing assembly 300 may be configured in the second configuration C2 by replacing a first seal element 320 with a monolithic seal element 320" with at least one protruding seal 3251 disposed in a position downstream of the first seal position (e.g., in a central position).

Importantly, since the seal position in the first configuration C1 is upstream of the seal position in the second configuration C2 positions, a seal 326 of the first configuration C1 protects the portion of the casing against which the seal 326 of the second configuration C2 seals. That is, a seal 326 of the first configuration C1 may prevent high pressures and abrasive fluids from acting on the portion of the casing that the seal 326 seals against in the second configuration C2. Thus, when the seal element 320 is reconfigured from a first configuration C1 to a second configuration C2, the seal ring 326 may seal against a fresh (i.e., unworn) portion of the casing 206 (the portion defining an interior wall of the segment in which the sealing assembly 300 is installed).

Once the sealing assembly 300 is reinstalled in the fluid end 104 in its second configuration C2, the fluid end 104 may be fully sealed (assuming other seals have not been removed), and the power end can be reactivated to cause the fluid to flow through the fluid end 104 again. Thus, the techniques presented herein may provide a highly effective and efficient of servicing covers, plugs, and/or sleeve that minimizes down time for the pump.

Figure 8A:
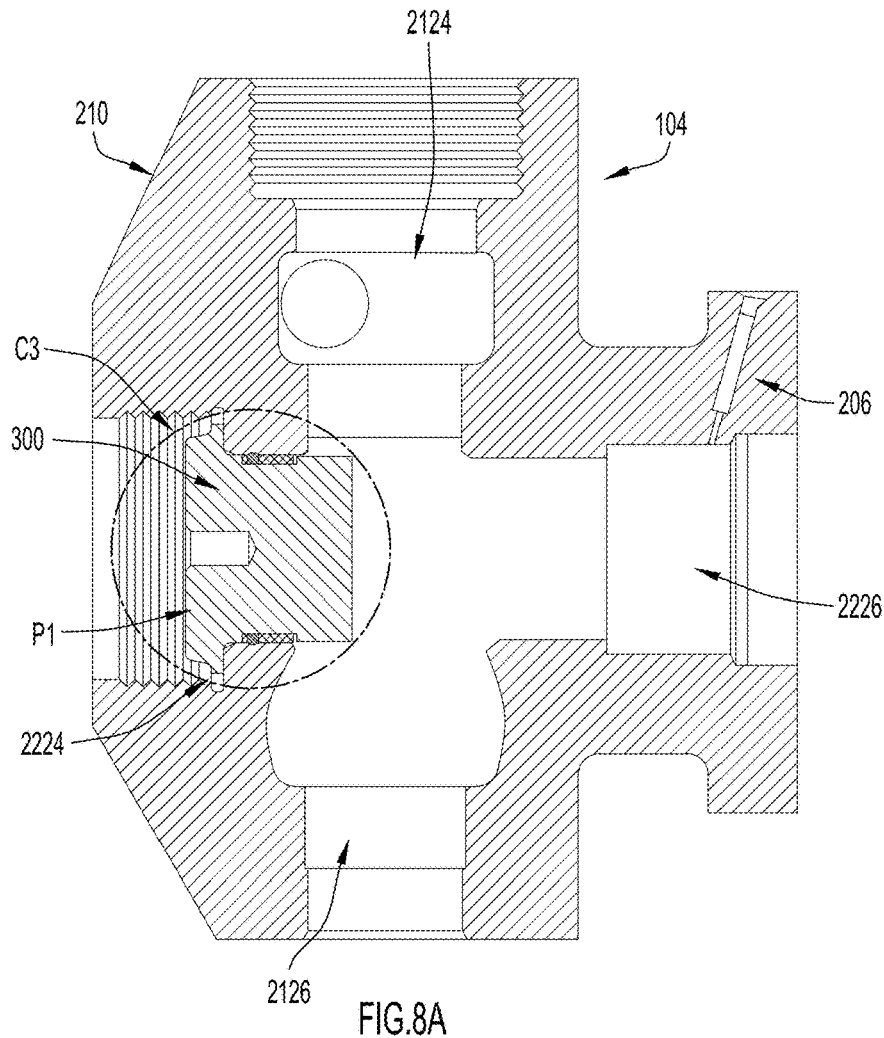
Figure 8B:
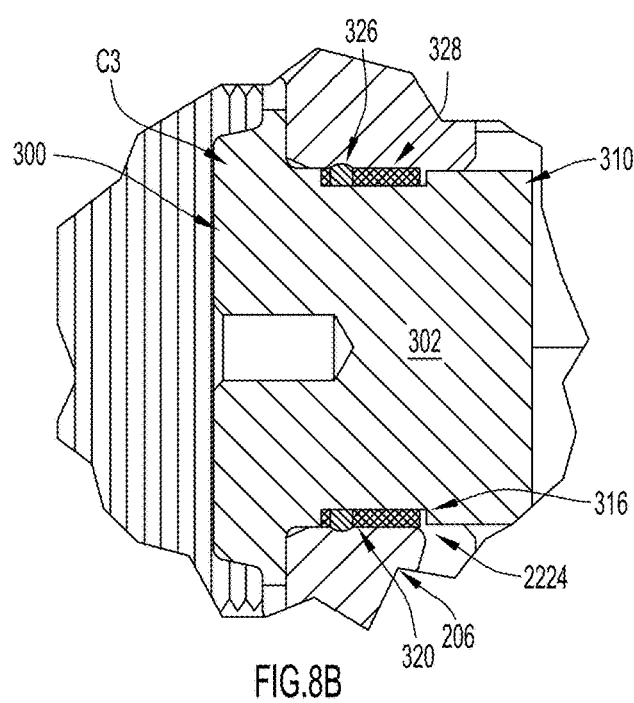

Then, if the seal assembly 300 starts to leak or otherwise fail again (e.g., before the fluid end 104 reaches the end of its useful life), the power end can be deactivated again and the seal assembly can be removed from its segment (e.g., segment 2224) so that the seal element 320 can be reconfigured to a third configuration C3, as is shown in FIGS. 8A and 8B. Alternatively, in some embodiments, it may be possible to reconfigure the seal element 320 to a third configuration C3 while the sealing assembly 300 is installed in a segment (e.g., segment 2224).

As can be seen in FIGS. 8A and 8B, when the seal element 320 is reconfigured to a third configuration C3, the seal element 320 is still positioned with the single groove 316, but now the seal ring 326 is positioned in a third axial position, which may be referred to as a downstream axial position. More specifically, in the depicted embodiment, the seal ring 326 is positioned proximate the downstream end of the groove 316, axially downstream of the position of the seal ring 326 in both the first configuration C1 and the second configuration C2. Thus, when the sealing assembly 300 is reinstalled in segment 2224 in position P1 with the seal element 320 in the third configuration C3, the seal ring 326 will be positioned to seal against a third portion of the interior wall of segment 2224 that is downstream of the portions engaged by the seal ring 326 in the first configuration C1 and the second configuration C2.

As an example of a seal assembly 300 configured in the third configuration C3, FIG. 8B illustrates the sealing assembly 300 with a seal ring 326 mounted in a pocket of a seal carrier 328 that defines the pocket at, or at least proximate to, a downstream end of groove 316 on the closure element 302 However, in other embodiments, a monolithic seal element 320" with at least one protruding seal 3251 disposed at, or at least proximate to, a downstream end of groove 316 could be installed on closure element 302. As another alternative, a seal ring 326 could be installed into groove 316 first and two or more seal carriers, such as seal carriers 328(1) and/or 328(2), could be installed into groove 316 to secure the seal ring 326 in a downstream position.

That all said, in at least some embodiments, the third configuration C3 is a mirrored configuration of the first configuration C1. Thus, in some embodiments, the third configuration C3 can be attained by flipping the seal element 320 of the first configuration C1 upside down. As mentioned, in some instances, the seal ring 326 may wear during use in a first configuration. Thus, even if the third configuration C3 can be achieved by flipping the seal element 320 of configuration to a mirrored orientation, it may still be necessary to replace the seal ring (e.g., seal ring 326 or 326') as part of the reconfiguration.

Regardless of how the third configuration C3 is achieved, the earlier seals of configurations C1 and C2 may protect the portion of the casing against which the seal 326 of the third configuration C3 seals. That is, seals 326 of the first and second configurations C1 and C2 may prevent high pressures and abrasive fluids from acting on the portion of the casing that the seal 326 seals against in the third configuration C3. Thus, when the seal element 320 is reconfigured to a third configuration C3, the seal ring 326 may seal against a fresh (i.e., unworn) portion of the casing 206 (the portion defining an interior wall of the segment in which the sealing assembly 300 is installed).

Once the sealing assembly 300 is reinstalled in the fluid end 104 in its third configuration C3, the fluid end 104 may be fully sealed (assuming other seals have not been removed), and the power end can be reactivated to cause the fluid to flow through the fluid end 104 again. Notably, in at least some embodiments, the seal ring 326 will be configured to have a lifespan that is at least one-third of the lifespan of the casing 206. Thus, after two reconfigurations (e.g., from configuration C1 to C2 and from configuration C2 to C3), the fluid end may reach the end of its useful life and no further reconfigurations may be required. At this point, the seal assembly 300 can be transferred to a new fluid end 104 or disposed of.

Now referring generally to FIGS. 6A, 6B, 7A, 7B, 8A, and 7B, in at least some instances, the various seal elements (or components thereof) needed for reconfiguration may be provided in a kit. For example, a kit may include one closure element 302 and two seal elements 320 designed to configure the seal assembly in the first configuration C1 and the second configuration C2 (or the third configuration C3). Alternatively, a kit may include one closure element 302 and three seal elements 320 designed to configure the seal assembly in the first configuration C1, the second configuration C2, and third configuration C3. In some instances, the two or more seal elements may be color coded to provide indications of configurations (e.g., configuration C1 seal elements are green, configuration C2 seal elements are yellow, and configuration C3 seal elements are red).

Regardless of the number and coloring of seal elements included in a kit, the seal elements in a kit may be variations of the same embodiment. For example, in some embodiments, all of the two or more seal elements in a kit may be rearranged version of the seal element 320 depicted in FIG. 4A. Thus, as an example, a first seal element may include a seal ring 326 downstream of two or more seal carriers, a second seal element may include a seal ring disposed between seal carriers, and a third seal element may include a seal ring disposed downstream of the two or more seal carriers.

Alternatively, a kit may include seal elements from multiple embodiments. For example, a first seal element of a kit may be formed in accordance with the embodiment the seal element 320 depicted in FIG. 4A, a second seal element of the kit may be formed in accordance with the embodiment the seal element 320 depicted in FIG. 4B, and a third seal element of the kit may be formed in accordance with the embodiment the seal element 320 depicted in FIGS. 5A and 5B. As another example, two seal elements may be formed from one embodiment and one or more additional seal elements may be formed from another embodiment.

Still further, in some instances, the kit need not include only fully formed seal elements and can include portions thereof. For example, a kit may include two seal carriers (e.g., seal carriers 328(1) and 328(2)) and three seal rings 326. Then, if necessary, the seal ring 326 can be replaced during each reconfiguration of the seal assembly 300. As another example, a kit may include three seal rings 326' and two pocketed carriers 328. One of the carriers 328 may include a central pocket and the other carrier 328 may have an edge pocket that can be flipped to provide a downstream or upstream pocket. Then, the kit can be used to reconfigure a seal assembly 300 between configurations C1, C2, and C3 while replacing the seal ring 326' during each reconfiguration (if necessary).

Figure 9:
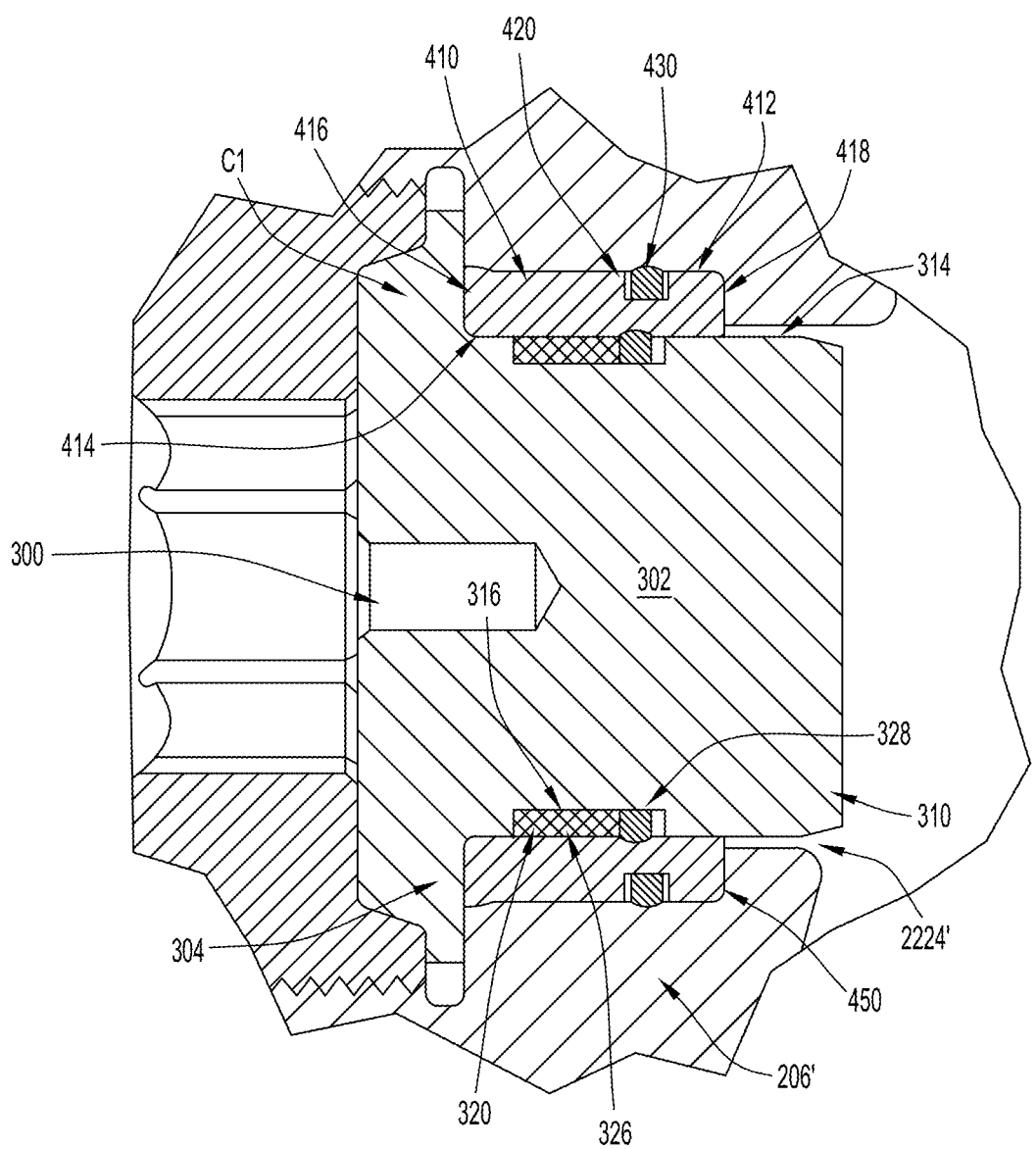
FIG. 9 is a side sectional view of a second example embodiment of the sealing assembly presented herein.

Now turning to FIGS. 9 and 10, these two Figures illustrate examples where the sealing techniques presented herein are utilized to seal against different casings and/or with different closure elements. More specifically, in the example embodiment depicted in FIG. 9, the seal assembly 300 described above is used to seal an access segment 2224' (i.e., a third segment 2224') of a second example embodiment of a casing 206' with a repositionable seal (e.g., progressively). Meanwhile, in the example embodiment depicted in FIG. 10, a seal assembly 500, which is a modified version of seal assembly 300, is used to seal an access segment 2224" (i.e., a third segment 2224") of a third example embodiment of a casing 206" with a repositionable seal (e.g., progressively).

The embodiments depicted in FIGS. 9 and 10 are each described in detail below; however, to be clear, it should be noted that although casings 206' and 206" are not shown in their entireties, casings 206' and 206" are both substantially similar to casing 206. The main difference between casing 206 and casing 206' is that casing 206' is shaped to define a space 450 adjacent the seal assembly 300 in which a secondary seal 410 can be installed. Similarly, the main difference between casing 206 and casing 206" is that casing 206" provides a shoulder 550 with which seal assembly 500 may engage. Thus, any description of casing 206 included above should be understood to apply to casings 206 and 206" unless otherwise explicitly stated (i.e., casings 206' and 206" may each have a plurality of pumping chambers defined by four intersecting segments). Moreover, to be completely clear, although FIGS. 9 and 10 depict seal assemblies in a single configuration (e.g., first configuration C1 in FIG. 9 and second configuration C2 in FIG. 10), these configurations are merely examples. Thus, embodiments including the features depicted in these Figures may allow seal elements to be positioned is in any desired configuration or position in any manner described herein.

Now turning to FIG. 9 specifically, in this embodiment, the seal assembly 300 described in connection with previous Figures seals a casing 206" that provides a space 450 for a secondary seal 410. Thus, seal assembly 300 may have any of the structures and functionality described above, but now, the seal element 320 of the seal assembly 300 seals against a secondary seal 410 instead of sealing directly against casing 206'. Thus, in some instances, the seal element 320 may be described as forming an indirect seal with the casing 206'.

In the example embodiment depicted in FIG. 9, the secondary seal 410 is an annular seal that extends from an exterior lateral surface 412 to an interior lateral surface 414. Additionally, the secondary seal 410 extends axially from a downstream end 416 positioned downstream of the seal ring 326 (of the seal element 320) to an upstream end 418 positioned upstream of the seal ring 326. For example, in the depicted embodiment, the downstream end 416 is positioned adjacent the flange 304 of the closure element 302 and the upstream end 418 extends upstream of the groove 316. That is, in the depicted embodiment, the secondary seal 410 spans or covers the seal element 320 and, thus, the interior lateral surface 414 engages both the seal element 320 and the lateral surface 314 of the sealing portion 310 of the closure element 302. In fact, in the depicted embodiment, the secondary seal 410 entirely fills the space 450 provided by the casing so that it is sandwiched between the casing 206" and the flange 304 of the closure element 302. Thus, the secondary seal 410 is stationary or nearly stationary.

Regardless of the dimensions of the secondary seal 410, when the secondary seal 410 is disposed between the seal assembly 300 and the casing 206', the exterior lateral surface 412 of the secondary seal 410 abuts and seals against a portion of the interior wall of the access segment 2224'. Meanwhile, the interior lateral surface 414 of the secondary seal 410 abuts and seals against at least the seal ring 326 of the seal element 320 (if not the entire seal element 320). In at least some embodiments, the secondary seal 410 can be formed from materials (e.g., rubbers, plastics, etc.) that are softer than the casing 206" and, thus, can provide a low-wear surface on which the seal ring 326 may seal against. This may extend the life of the seal ring 326 as compared to a seal ring 326 that seals directly against the casing 206".

In at least some instances, the secondary seal 410 may also define a pocket 420 for a secondary seal insert 430 that can be made of material softer than the material forming the main body of the secondary seal 410 (e.g., softer rubbers, plastics, etc.). Thus, the secondary seal insert 430 may ensure that the secondary seal 410 completely seals against the casing 206". That is, the secondary seal 410 may be formed from materials similar to those used to form seal carrier 328 and the secondary seal insert 430 may be formed from materials similar to those used to form seal ring 326, so that embodiments with the secondary seal insert 430 form seals defined by comparatively softer material on the exterior lateral surface 412 and the interior lateral surface 414 of the secondary seal 410. Moreover, while FIG. 9 shows pocket 420 positioned proximate the upstream end 418 of the secondary seal 410, this is just an example, and in different embodiments, or even in different configurations, the pocket 420 may be positioned in different axial positions. For example, the pocket 420 can be axially centered, proximate or adjacent to the downstream end 416 of secondary seal 410, and/or repositioned for different configurations.

Now turning to FIG. 10, in this example embodiment, seal assembly 500 is used to seal casing 206" in accordance with the sealing techniques presented herein. Seal assembly 500 includes a closure element 502 that, like closure element 302, can receive seal element 320 (including seal ring 326 and one or more seal carriers 328, e.g., in the form of seal carrier 328(1) and seal carrier 328(2)). However, closure element 502 is somewhat "flipped" or reversed in comparison to closure element 302.

More specifically, closure element 502 includes a sealing portion 510 that extends from a top or proximal surface 506 and a flange 504 that is positioned upstream of the sealing portion 510. The sealing portion 510 still defines a single groove 516, but now, the flange 504 defines the upstream end 517 of the single groove 516 and the downstream end 515 of the groove 516 terminates at the proximal surface 506 of the closure element 502. Thus, the downstream end 515 of the groove 516 does not have a wall. Instead, a downstream wall of the groove 516 is defined by a retaining element 600 when the retaining element 600 is secured to casing 206" and locks closure element 502 into segment 2224" of casing 206". However, despite this difference, seal assembly 500 may otherwise function and operate in the same manner described above (e.g., by receiving any embodiments of seal elements 320 to allow axial movement of seal ring 326). In fact, this embodiment could also function with a secondary seal, as shown and described in connection with FIG. 9.

Still referring to FIG. 10, in use, a seal element 320 is installed onto closure element 502 to form seal assembly 500 before or after the closure element 502 is inserted into segment 2224". Then, the retaining element 600 is threaded into engagement with segment 2224" to press the closure element 502 against the casing 206" and, more specifically, to press flange 504 against shoulder 550, locking the seal assembly 500 into place within segment 2224". Notably, since the downstream end 515 of groove 516 is exposed prior to installation of the retaining element 600, seal element 320 can be installed onto closure element 502 while closure element 502 is in segment 2224". This may make initial installation and/or reconfiguration of seal element 320 easier for an end user. For example, when a seal element 320, or a portion thereof (e.g., seal ring 326), is worn out, the closure element 502 need not be removed from the segment 2224". Instead, only the seal element 320, or a portion thereof, can be replaced and/or reconfigured. If closure element 502 has become lodged in segment 2224", this may be particularly advantageous, since closure element 502 need not be forced out.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the sealing assembly described herein, or portions thereof may be fabricated from any commonly used seal materials, such as homogeneous elastomers, filled elastomers, partially fabric reinforced elastomers, and full fabric reinforced elastomers. Suitable resilient elastomeric materials includes, but re not limited to, thermoplastic polyurethane (TPU), thermoplastic copolyester (COPE), ethylene propylene diene monomer (EPDM), highly saturated nitrile rubber (HNBR), reinforced versions of the foregoing materials, such as versions reinforced with fibers or laminations of woven material, as well as combinations of any of the foregoing materials.

Similarly, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. A sealing kit for a fluid end of a reciprocating pump, the sealing kit being installable within a segment of a casing of the fluid end and being arranged to form a seal with the segment, the sealing kit comprising:
  a closure element with a sealing portion, the sealing portion having a lateral surface that faces an interior wall of the segment and that includes a groove; and
  a seal element sized to be installed in the groove, the seal element including:
    a repositionable seal that is movable axially within the groove so that the repositionable seal can be positioned in multiple sealing positions; and
    one or more seal carriers configured to position the repositionable seal within the groove, wherein the one or more seal carriers define a pocket for the repositionable seal that is axially repositionable with respect to the groove, wherein the pocket comprises an axially extending surface bounded by at least one lateral wall, and wherein one or more internal surfaces of the one or more seal carriers abut an axially extending surface of the groove while an internal surface of the repositionable seal abuts the axially extending surface of the pocket.

2. The sealing kit of claim 1, wherein the pocket is axially repositionable by replacing the one or more seal carriers with one or more new seal carriers that form a new pocket in a new axial position.

3. The sealing kit of claim 1, wherein the repositionable seal is a first seal and the sealing kit further comprises a second seal that has like dimensions to the first seal, the second seal being installable into the pocket in place of the first seal during or subsequent to a repositioning of the pocket.

4. The sealing kit of claim 1, wherein the one or more seal carriers are rearranged within the groove to axially reposition the repositionable seal, including to a first configuration in which a first seal carrier of the one or more seal carriers abuts a first side of the repositionable seal and to a second configuration in which the first seal carrier abuts a second side of the repositionable seal, the second side being opposite the first side.

5. The sealing kit of claim 4, wherein the repositionable seal is a first seal and the sealing kit further comprises a second seal that has like dimensions to the first seal, the second seal being configured to be replace the first seal during or subsequent to a reconfiguration of the one or more seal carriers.

6. The sealing kit of claim 1, wherein the seal element is a monolithic component with the repositionable seal integrally formed therein and the sealing kit further comprises a new seal element that includes a new seal in a new axial position, the new seal element being configured to position the new seal in a new position within the groove that is axially offset from a position of the repositionable seal within the groove.

7. The sealing kit assembly of claim 1, wherein the seal element is a first seal element and the sealing kit further comprises:
  a second seal element sized to fit within the groove and configured to replace the first seal element when fluid starts to leak through the repositionable seal and a first portion of the casing engaged with the repositionable seal, the second seal element including a second seal positioned within the groove, but axially offset from the repositionable seal so that the second seal engages a second portion of the casing that is axially offset from the first portion of the casing.

8. The sealing kit of claim 7, further comprising:
  a third seal element sized to fit within the groove and configured to replace the second seal element when fluid starts to leak through the second seal and the second portion of the casing, the third seal element including a third seal positioned within the groove, but axially offset from the repositionable seal so that the third seal engages a third portion of the casing that is axially offset from the second portion of the casing.

9. The sealing kit of claim 1, wherein the closure element includes a body that extends from a proximal surface to a distal surface, and the groove of the sealing portion of the closure element is defined between the proximal surface and the distal surface.

10. A seal kit for a sealing assembly that is configured to seal a segment of a casing of a fluid end of a reciprocating pump, the sealing assembly including a closure element with a lateral surface that faces an interior wall of the segment, the lateral surface including a groove, and the seal kit comprising:
  a first seal element configured to be installed in the groove, the first seal element including a first seal and one or more first seal carriers that define a pocket configured to position the first seal within the groove to seal against a first portion of the casing forming the segment, wherein the pocket comprises an axially extending surface bounded by at least one lateral wall, and wherein one or more internal surfaces of the one or more first seal carriers abut an axially extending surface of the groove while an internal surface of the first seal abuts the axially extending surface of the pocket; and
  a second seal element configured to be installed in the groove, the second seal element including a second seal and one or more second seal carriers, wherein the one or more second seal carriers define the pocket in a new axial position to position the second seal to seal against a second portion of the casing forming the segment, the second portion being axially offset from the first portion.

11. The seal kit of claim 10, further comprising:
  a third seal element configured to be installed in the groove, the third seal element including a third seal positioned to seal against a third portion of the casing forming the segment, the third portion being axially offset from the second portion.

12. The seal kit of claim 10, wherein one set of components is utilized to form the one or more first seal carriers and the one or more second seal carriers.

13. The seal kit of claim 12, wherein the second seal element is formed by rearranging the one or more first seal carriers from a first configuration to a second configuration, wherein a first seal carrier of the one or more first seal carriers abuts a first side of the first seal in the first configuration and the first seal carrier abuts a second side of the second seal in the second configuration, the second side being opposite the first side.

14. The seal kit of claim 13, wherein the first seal is removable from the one or more first seal carriers, and the second seal element is formed by replacing the first seal with the second seal.

15. The seal kit of claim 10, wherein the first seal element and the second seal element are single-piece elements and the second seal element is installed in the groove after removing the first seal element.

16. A method of sealing an externally open segment of a fluid end of a reciprocating pump with a sealing assembly, the fluid end being driven by a power end and the method comprising:

positioning a first seal element within a groove disposed on a lateral surface of a closure element to form a first sealing assembly, the first seal element including a first seal and one or more seal carriers configured to position the first seal within the groove, wherein the one or more seal carriers define a pocket for the first seal that is axially repositionable with respect to the groove, wherein the pocket comprises an axially extending surface bounded by at least one lateral wall, and wherein one or more internal surfaces of the one or more seal carriers abut an axially extending surface of the groove while an internal surface of the first seal abuts the axially extending surface of the pocket;

installing the first sealing assembly in the externally open segment so that the lateral surface of the closure element faces an interior wall of the externally open segment and the first seal is positioned to seal against a first portion of the interior wall of the externally open segment;

activating the power end to cause fluid to flow through the fluid end;

deactivating the power end;

removing the first seal element from the groove;

positioning a second seal element within the groove on the lateral surface of the closure element to form a second sealing assembly;

installing the second sealing assembly in the externally open segment so that the lateral surface of the closure element faces the interior wall of the externally open segment, the second seal element including a second seal positioned to seal against a second portion of the interior wall of the externally open segment that is axially offset from the first portion of the interior wall; and reactivating the power end to cause the fluid to flow through the fluid end.

17. The method of claim 16, further comprising:
subsequent to reactivating the power end, deactivating the power end again;
removing the second seal element from the groove;
positioning a third seal element within the groove on the lateral surface of the closure element to form a third sealing assembly; and
installing the third sealing assembly in the externally open segment so that the lateral surface of the closure element faces the interior wall of the externally open segment, the third seal element including a third seal positioned to seal against a third portion of the interior wall of the externally open segment that is axially offset from the second portion of the interior wall.

18. The method of claim 16, wherein positioning the second seal element within the groove on the lateral surface of the closure element of the sealing assembly further comprises:
rearranging the one or more seal carriers of the first seal element to create a second seal position for the second seal.

* * * * *

UNITED STATES PATENT AND TRADEMARK OFFICE
CERTIFICATE OF CORRECTION

| | |
|---|---|
| PATENT NO. | : 12,247,561 B2 |
| APPLICATION NO. | : 17/549997 |
| DATED | : March 11, 2025 |
| INVENTOR(S) | : Adam Bradley Avey and Konner Casey Kay |

Page 1 of 1

It is certified that error appears in the above-identified patent and that said Letters Patent is hereby corrected as shown below:

In the Claims

Claim 7, Column 21, Line 54, please replace "The sealing kit assembly of claim 1" with --The sealing kit of claim 1--

Signed and Sealed this
Fifteenth Day of July, 2025

Coke Morgan Stewart
*Acting Director of the United States Patent and Trademark Office*